(12) United States Patent
Kon et al.

(10) Patent No.: US 8,165,548 B2
(45) Date of Patent: Apr. 24, 2012

(54) RECEIVING APPARATUS

(75) Inventors: Yoshihiko Kon, Ashikaga (JP); Seiya Kamimura, Kamagaya (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 292 days.

(21) Appl. No.: 12/718,588

(22) Filed: Mar. 5, 2010

(65) Prior Publication Data

US 2010/0233988 A1   Sep. 16, 2010

(30) Foreign Application Priority Data

Mar. 13, 2009   (JP) .................................. 2009-61319

(51) Int. Cl.
*H04B 17/00* (2006.01)
*H04M 1/00* (2006.01)

(52) U.S. Cl. .................................. 455/226.1; 455/552.1

(58) Field of Classification Search .................. 455/130, 455/131, 226.1, 226.2, 230, 303, 552.1, 553.1; 348/462, 470, 726, 738
See application file for complete search history.

(56) References Cited

U.S. PATENT DOCUMENTS

| 7,343,143 B2 * | 3/2008 | Gamou ...................... 455/226.1 |
| 8,027,419 B2 * | 9/2011 | Iannuzzelli et al. .......... 455/130 |

FOREIGN PATENT DOCUMENTS

JP   2006-115200 A   4/2006

* cited by examiner

*Primary Examiner* — Quochien B Vuong
(74) *Attorney, Agent, or Firm* — Osha Liang LLP

(57) ABSTRACT

A receiving apparatus includes an analog demodulation unit, a digital demodulation/decoding unit, a delay unit, a reception state detecting unit, first/second processing units, and a mixing processing unit. The analog demodulation unit demodulates a first audio signal. The digital demodulation/decoding unit demodulates and decodes a second audio signal. The delay unit delays at least one of the first and second audio signals, to be outputted as third and fourth audio signals. The reception state detecting unit outputs an analog reception state signal. The first/second audio processing units control at least one of volume and quality of the third/fourth audio signals, to be outputted as fifth and sixth audio signals. The mixing processing unit mixes the fifth and sixth audio signal at a predetermined ratio, outputted according to a reception state of at least one of a broadcast wave of analog broadcasting and the broadcast wave of digital broadcasting.

9 Claims, 9 Drawing Sheets

RECEIVING APPARATUS

CROSS-REFERENCE TO RELATED APPLICATION

This application claims the benefit of priority to Japanese Patent Application No. 2009-61319, filed Mar. 13, 2009, of which full contents are incorporated herein by reference.

BACKGROUND OF THE INVENTION

1. Field of the Invention

The present invention relates to a receiving apparatus.

2. Description of the Related Art

In a transition period from analog broadcasting to digital broadcasting of radio or television, simultaneous broadcasting may be executed in which the same program is broadcasted both in the analog broadcasting and the digital broadcasting. For example, in radio broadcasting by the IBOC (In-Band On-Channel) method, as illustrated in FIG. 8, a broadcast wave of the digital broadcasting (hereinafter referred to as a digital broadcast wave) whose contents is the same as those of the analog broadcasting is transmitted using both sides of the broadcast wave of the analog broadcasting (hereinafter referred to as an analog broadcast wave). Thus, a receiving apparatus supporting the digital broadcasting (hereinafter referred to as a digital receiving apparatus) can receive the digital broadcast wave and reproduce high-quality sound, while even a receiving apparatus supporting the analog broadcasting (hereinafter referred to as an analog receiving apparatus) can still receive the analog broadcast wave. Therefore, it is possible to smoothly spread the use of the digital receiving apparatuses and shift from the analog broadcasting to the digital broadcasting, while keeping reception by the analog receiving apparatus.

Also, when the simultaneous broadcasting is executed as above, it is also possible to receive both the analog broadcast wave and the digital broadcast wave, and reproduce high-quality digital broadcasting sound (hereinafter referred to as digital sound) and existing analog broadcasting sound (hereinafter referred to as analog sound) with switching them according to a reception state. For example, in Japanese Patent Laid-Open Publication No. 2006-115200, a receiving apparatus (receiver) is disclosed that is capable of adjusting a time difference or a volume difference between the analog sound and the digital sound, to decrease a sense of discomfort at switching of the sounds.

Here, in the radio broadcasting by the IBOC method, an example of a configuration of the receiving apparatus is illustrated in FIG. 7, which is capable of adjusting the time difference and the volume difference between the analog sound and the digital sound as in the case of the receiving apparatus disclosed in Japanese Patent Laid-Open Publication No. 2006-115200. In the receiving apparatus illustrated in FIG. 7, the analog broadcast wave is converted into an audio signal through an antenna 1, a receiving unit 2, an AD (analog-digital) conversion unit 3, and an analog demodulation unit 10, while the digital broadcast wave is converted into an audio signal through the antenna 1, the receiving unit 2, the AD conversion unit 3, a digital demodulation unit 20, and a decoding unit (decoder) 25. Also, the audio signals of the analog broadcasting and the digital broadcasting (hereinafter referred to as an analog audio signal and a digital audio signal, respectively) have phase differences (time differences) adjusted in delay units 11 and 21, and have volume differences adjusted in volume adjusting units 13 and 23, and then, are inputted to a mixing processing unit 4. Moreover, a mixing ratio control unit 41 of the mixing processing unit 4 outputs a switching signal SW according to a reception state signal ADR indicating a reception state of the analog broadcast wave or the digital broadcast wave, and the mixing unit 42 switches between the analog audio signal and the digital audio signal according to the switching signal SW, to be outputted, but in a process of such switching, the both signals are mixed and a mixing ratio is changed according to the reception state and outputted, and thus, rapid change in the volume or quality is alleviated.

As mentioned above, after the phase difference or volume difference between the analog audio signal and the digital audio signal is adjusted, both signals are mixed at a predetermined ratio according to the reception state, as well as switched therebetween, to be outputted, so that the sense of discomfort at the switching is decreased and the rapid change in the volume or quality can be alleviated.

Here, there are illustrated in FIGS. 9 and 10 examples of a relationship between electric field intensity and quality of the broadcast wave in the analog broadcasting and the digital broadcasting, respectively. As illustrated in FIG. 9, the more intense the electric field of the analog broadcast wave becomes, the higher quality the analog audio signal has, while the weaker the electric field of the analog broadcast wave becomes, the lower quality the analog audio signal has. Also, as illustrated in FIG. 10, in the digital audio signal, if the digital broadcast wave has an electric field whose level is more intense than a predetermined intensity level Sth1 and an error rate of the signal demodulated from the digital broadcast wave is lower than a predetermined error level Rth, sound quality is maintained at a substantially constant high level, while if the digital broadcast wave has an electric field whose level is weaker than the intensity level Sth1 and the error rate is higher than the level Rth, the sound quality becomes so low level as to be hardly reproduced as a sound.

Moreover, there is illustrated in FIG. 11 an example of a change in the quality of the audio signal outputted from the mixing processing unit 4 if the broadcast wave becomes a weak electric field in the IBOC method radio broadcasting. Before a time t2 when the broadcast wave has sufficiently intense electric field, the mixing processing unit 4 mixes the analog audio signal and the digital audio signal at a ratio of 0% and 100%, respectively, that is, selects only the digital audio signal to be outputted. Also, at the time t2 when the broadcast wave becomes an electric field weaker than an intensity level Sth2 (>Sth1) and thereafter, the mixing processing unit 4 mixes the analog audio signal and the digital audio signal at a predetermined ratio, to be outputted. Moreover, after a time t1 when the broadcast wave becomes an electric field weaker than the intensity level Sth1, the mixing processing unit 4 mixes the analog audio signal and the digital audio signal at a ratio of 100% and 0%, respectively, that is, selects only the analog audio signal, to be outputted. As illustrated by a solid line in FIG. 11, for example, during a period from the time t2 to the time t1, the mixing processing unit 4 smoothly changes the ratio of mixing between the analog audio signal and the digital audio signal.

However, even if the mixing ratio is changed smoothly, the mixing processing unit 4, at the time t2, selects only the digital audio signal, which is kept at a substantially constant high quality, to be outputted, and at the time t1, selects only the analog audio signal to be outputted whose quality is lowered as the broadcast wave becomes a weaker electric field. Thus, the change in the quality of the audio signal outputted from the mixing processing unit 4 during a period from the time t2 to the time t1 becomes more rapid than the change in the quality of the analog audio signal indicated by a long broken line in FIG. 11, for example.

Therefore, a sense of discomfort might occur when switching between the analog audio signal and the digital audio signal.

SUMMARY OF THE INVENTION

A receiving apparatus according to an aspect of the present invention, comprises: an analog demodulation unit configured to demodulate a first audio signal from a broadcast wave of analog broadcasting whose frequency is included in a predetermined frequency band; a digital demodulation/decoding unit configured to demodulate and decode a second audio signal from a broadcast wave of digital broadcasting whose frequency is included in the frequency band, the digital broadcasting being the same in contents as the analog broadcasting; a delay unit configured to delay at least one of the first and second audio signals, to be outputted as third and fourth audio signals, respectively; a reception state detecting unit configured to output an analog reception state signal indicating a reception state of the broadcast wave of the analog broadcasting; the first audio processing unit configured to control at least one of volume and quality of the third audio signal, to be outputted as a fifth audio signal, according to the analog reception state signal; the second audio processing unit configured to control at least one of volume and quality of the fourth audio signal, to be outputted as a sixth audio signal, according to the analog reception state signal; and a mixing processing unit configured to mix the fifth audio signal and the sixth audio signal at a predetermined ratio, to be outputted, according to a reception state of at least one of the broadcast wave of the analog broadcasting and the broad cast wave of the digital broadcasting.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

===Configuration of Entire Receiving Apparatus and Operation Thereof===

A configuration of an entire receiving apparatus according to an embodiment of the present invention will hereinafter be described referring to FIG. 1.

Figure 1:
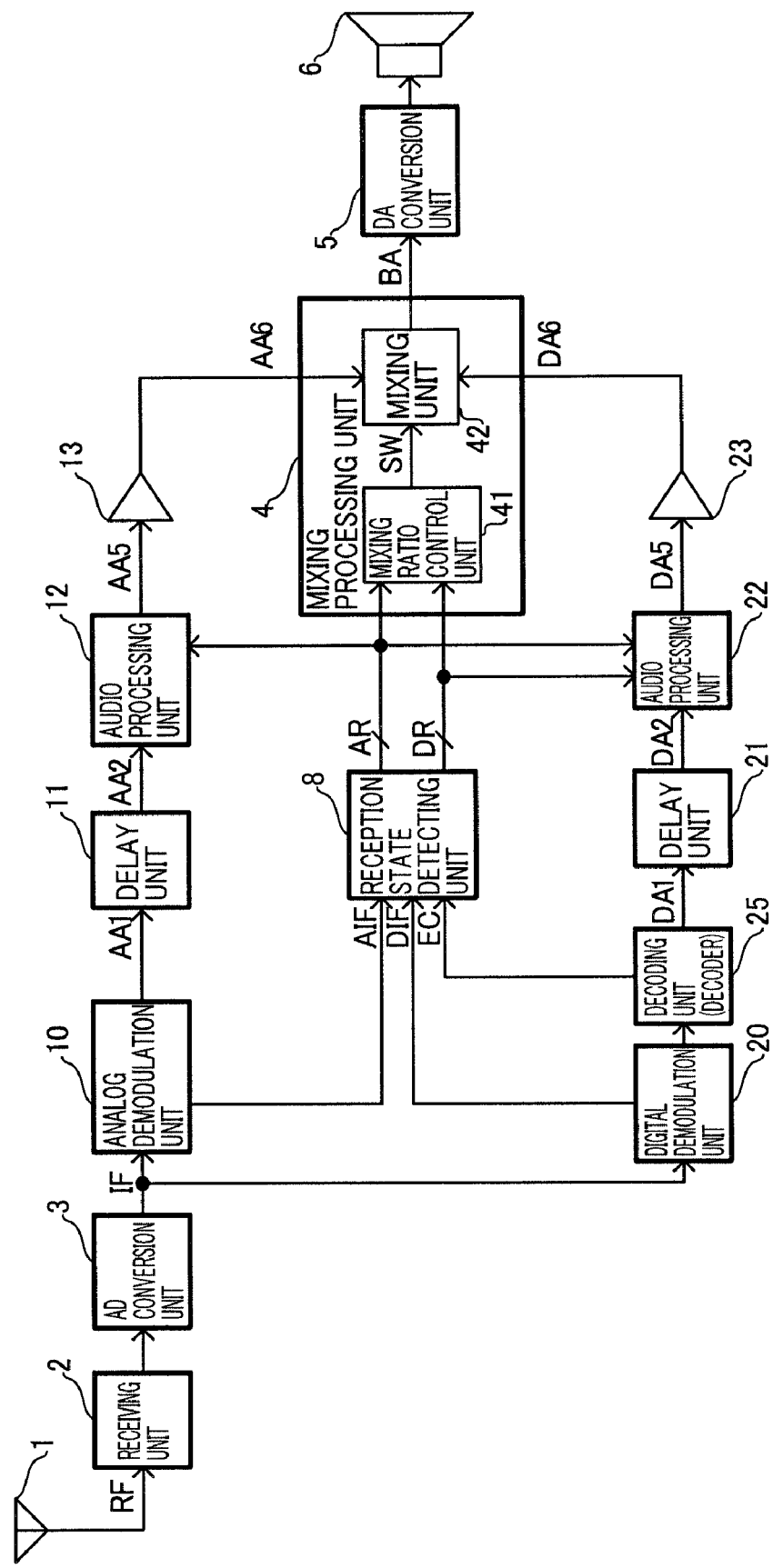
FIG. 1 is a block diagram illustrating a configuration of an entire receiving apparatus according to an embodiment of the present invention.

The receiving apparatus illustrated in FIG. 1 is an apparatus that receives broadcast waves of analog broadcasting and digital broadcasting in simultaneous broadcasting as mentioned above, and includes an antenna 1, a receiving unit 2, an AD conversion unit 3, an analog demodulation unit 10, a digital demodulation unit 20, a decoding unit 25, delay units 11 and 21, audio processing units 12 and 22, volume adjusting units 13 and 23, a reception state detecting unit 8, a mixing processing unit 4, a DA (digital-analog) conversion unit 5, and a speaker 6. In the receiving apparatus illustrated in FIG. 7, the audio processing unit 7 that controls volume or quality of the audio signal is provided on a subsequent stage of the mixing processing unit 4, while in the receiving apparatus according to an embodiment of the present invention, the audio processing units 12 and 22 that controls the volume and/or quality of an analog audio signal and a digital audio signal, respectively, are provided on the front stage of the mixing processing unit 4.

An RF (Radio Frequency) signal outputted from the antenna 1 is inputted to the receiving unit 2, and an output signal of the receiving unit 2 is inputted to the AD conversion unit 3. Also, an IF (Intermediate Frequency) signal outputted from the AD conversion unit 3 is inputted to the analog demodulation unit 10 and the digital demodulation unit 20.

An analog audio signal AA1 (first audio signal) outputted from the analog demodulation unit 10 is inputted to the delay unit 11, and an analog audio signal AA2 (third audio signal) outputted from the delay unit 11 is inputted to the (first) audio processing unit 12. Also, an analog audio signal AA5 (fifth audio signal) outputted from the audio processing unit 12 is inputted to the volume adjusting unit 13, and an analog audio signal AA6 outputted from the volume adjusting unit 13 is inputted to the mixing processing unit 4.

On the other hand, an output signal of the digital demodulation unit 20 is inputted to the decoding unit 25. The digital audio signal DA1 (second audio signal) outputted from the decoding unit 25 is inputted to the delay unit 21, and the digital audio signal DA2 (fourth audio signal) outputted from the delay unit 21 is inputted to the (second) audio processing unit 22. Moreover, the digital audio signal DA5 (sixth audio signal) outputted from the audio processing unit 22 is inputted to the volume adjusting unit 23, and the digital audio signal DA6 outputted from the volume adjusting unit 23 is inputted to the mixing processing unit 4.

A signal component (hereinafter referred to as an AIF signal) derived from the analog broadcast wave in the IF signal is inputted to the reception state detecting unit 8 from the analog demodulation unit 10. Also, an analog reception state signal AR outputted from the reception state detecting unit 8 according to the AIF signal is inputted to the audio processing units 12 and 22 and the mixing processing unit 4. Moreover, a signal component (hereinafter referred to as a DIF signal) derived from the digital broadcast wave in the IF signal is inputted from the digital demodulation unit 20, and an error control signal EC indicating occurrence of error control in decoding processing is inputted from the decoding unit 25, respectively, to the reception state detecting unit 8. Also, a digital reception state signal DR outputted from the reception state detecting unit 8 according to the DIF signal and the error control signal EC is inputted to the audio processing unit 22 and the mixing processing unit 4.

The mixing processing unit 4 includes a mixing ratio control unit 41 and a mixing unit 42, for example. The analog reception state signal AR and the digital reception state signal DR are inputted to the mixing ratio control unit 41, and a switching signal SW outputted from the mixing ratio control unit 41 is a control signal for controlling a mixing ratio in the mixing unit 42. Also, the analog audio signal AA6 and the digital audio signal DA6 are inputted to the mixing unit 42, and a mixed audio signal BA outputted from the mixing unit 42 is inputted to the DA conversion unit 5. An output signal of the DA conversion unit 5 is inputted to the speaker 6.

Subsequently, an operation of the entire receiving apparatus according to an embodiment of the present invention will be described.

The antenna 1 receives the analog broadcast wave and the digital broadcast wave that are transmitted simultaneously, to output an RF signal. Also, the receiving unit 2 selectively amplifies a frequency band including a desired carrier wave in the RF signal, to be frequency converted and removes an interference signal such as an image signal as appropriate using a BPF (Band-Pass Filter) or the like. Moreover, the AD conversion unit 3 converts the output signal of the receiving unit 2 into the IF signal, which is a digital signal, to be outputted. The processing in the analog demodulation unit 10 and the digital demodulation unit 20 and subsequent processing is digital signal processing by a digital circuit, a digital signal processor and the like.

Figure 8:
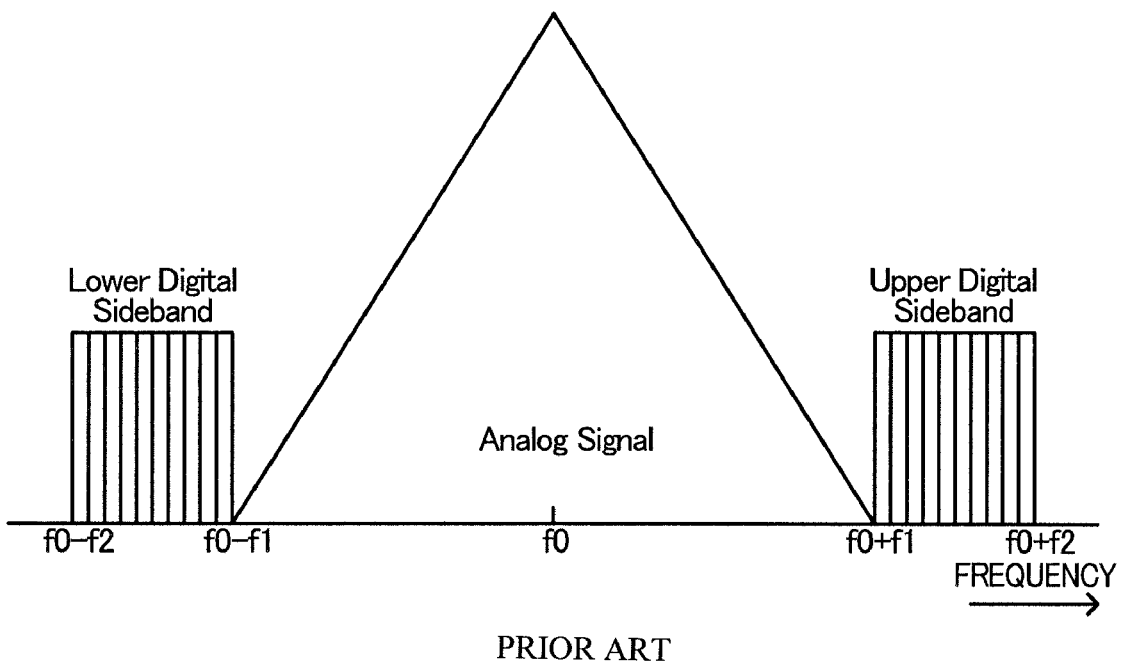
FIG. 8 is a schematic diagram illustrating an example of a relationship of frequencies between an analog broadcast wave and a digital broadcast wave by an IBOC method.
Figure 9:
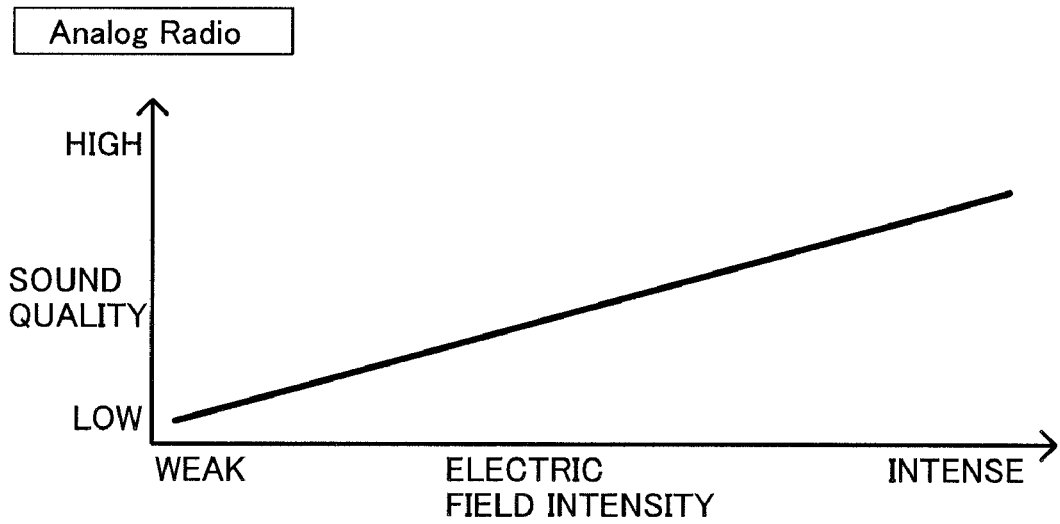
FIG. 9 is a schematic diagram illustrating an example of a relationship between electric field intensity and quality of a broadcast wave in analog broadcasting.
Figure 10:
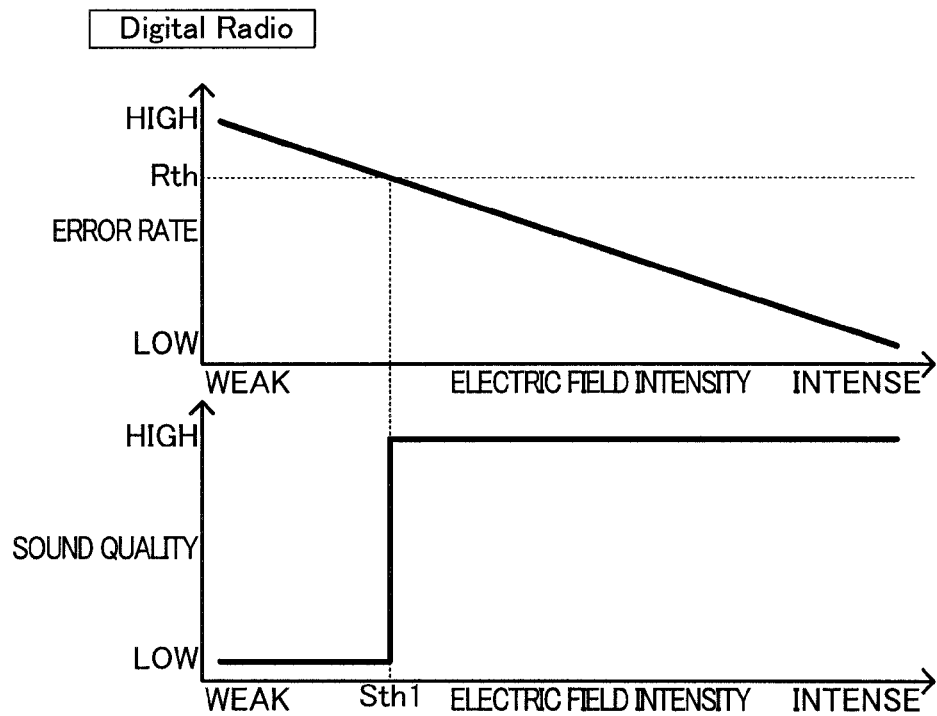
FIG. 10 is a schematic diagram illustrating an example of a relationship among electric field intensity, an error rate, and quality of a broadcast wave in digital broadcasting.

The analog demodulation unit 10 demodulates the above-mentioned AIF signal in the IF signal, to output the analog audio signal AA1. Also, the digital demodulation unit 20 demodulates the above-mentioned DIF signal in the IF signal, to be outputted, and then the decoding unit 25 decodes the output signal of the digital demodulation unit 20, to output the digital audio signal DA1. In FM radio broadcasting by an IBOC method, for example, as illustrated in FIG. 8, a digital broadcast wave is transmitted using upper and lower side bands, which are upper and lower by approximately 130 kHz (=f1) to approximately 200 kHz (=f2) with respect to a carrier wave frequency f0. In this case, each of the AIF signal and the DIF signal can be generated from the IF signal using the BPF, a BDF (Band-Elimination Filter) or the like.

The delay units 11 and 21 adjust a phase difference between the analog audio signal AA1 and the digital audio signal DA1 as a whole, to be outputted as the analog audio signal AA2 and the digital audio signal DA2, respectively. For example, if a phase of the digital audio signal DA1 lags behind a phase of the analog audio signal AA1 by decoding processing in the decoding unit 25, the phase difference between the analog audio signal AA2 and the digital audio signal DA2 is decreased by delaying only the analog audio signal AA1 in the delay unit 11 or by increasing a delay amount of the delay unit 11 so as to become greater than the delay amount of the delay unit 21.

The audio processing unit 12 controls volume and/or quality of the analog audio signal AA2 according to the analog reception state signal AR, to be outputted as the analog audio signal AA5. Also, the audio processing unit 22 controls volume or quality of the digital audio signal DA2 according to the analog reception state signal AR or the digital reception state signal DR, to be outputted as the digital audio signal DA5. Operations of the audio processing units 12 and 22 will be described later in detail.

The volume adjusting units 13 and 23 adjust a volume difference between the analog audio signal AA5 and the digital audio signal DA5 as a whole, to be outputted as the analog audio signal AA6 and the digital audio signal DA6, respectively. The sound adjusting units 13 and 23 amplify or attenuate both of or either one of the output signals of the audio processing units 12 and 22 so that a volume difference, which is generated in the input signals of the audio processing units 12 and 22, is decreased. Thus, if different volume control is performed in the audio processing units 12 and 22, the volume difference may not be decreased by the adjustment in the volume adjusting units 13 and 23.

The reception state detecting unit 8 detects electric field intensity, an interference wave and the like of the analog broadcast wave on the basis of the AIF signal, and outputs the analog reception state signal AR indicating the reception state of the analog broadcast wave. Moreover, the reception state detecting unit 8 detects electric field intensity and an error rate in the decoding processing of the digital broadcast wave on the basis of the DIF signal and the error control signal EC, and outputs the digital reception state signal DR indicating a reception state of the digital broadcast wave. Operation of the reception state signal detecting unit 8 will be described later in detail.

Figure 7:
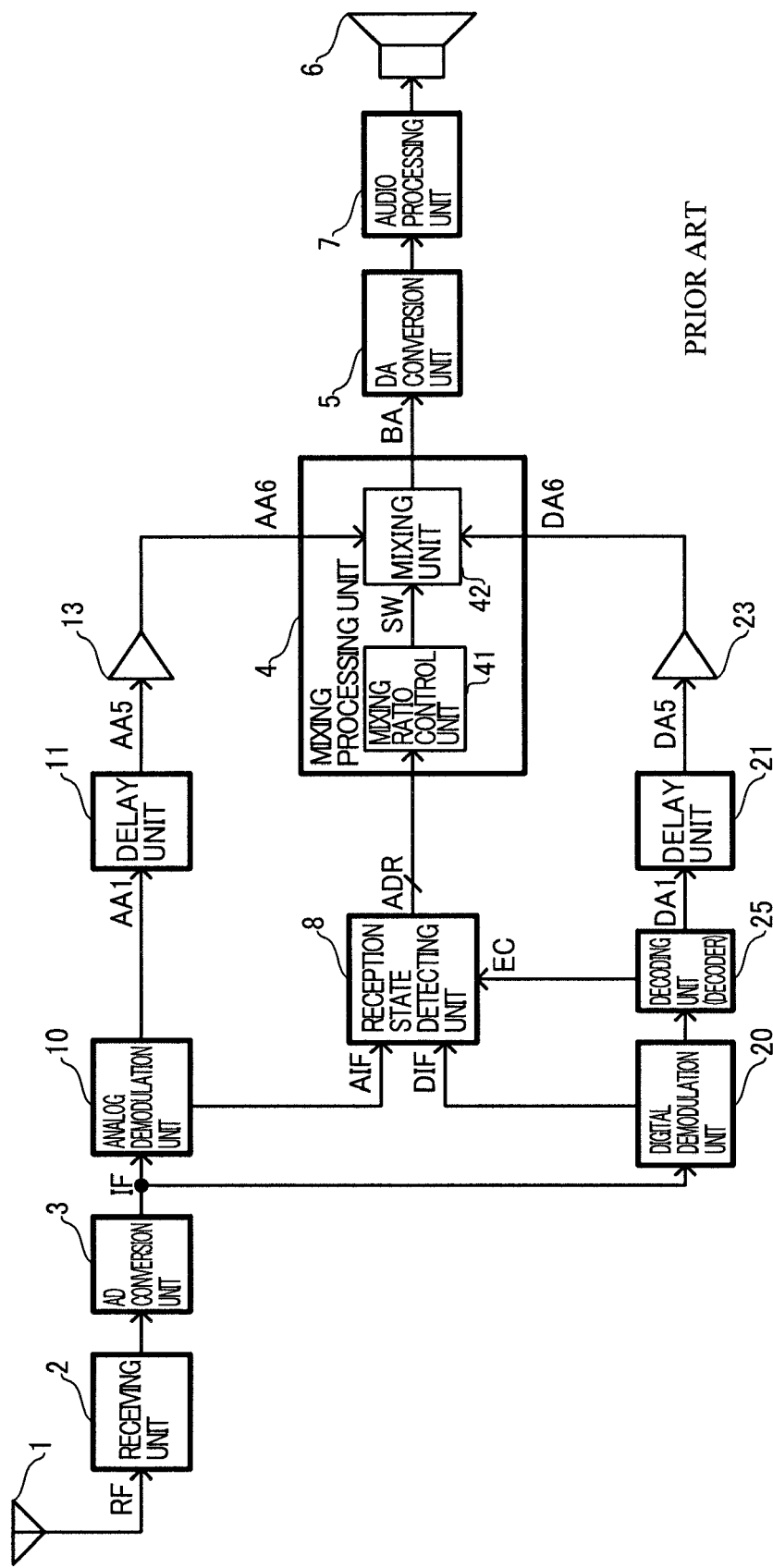
FIG. 7 is a block diagram illustrating an example of a configuration of a common receiving apparatus of IBOC-method radio broadcasting.

The mixing ratio control unit 41 of the mixing processing unit 4 outputs the switching signal SW according to the analog reception state signal AR and the digital reception state signal DR, as in the case of a common receiving apparatus illustrated in FIG. 7, and the mixing unit 42 mixes the analog audio signal AA6 and the digital audio signal DA6 at a predetermined ratio as well as switches therebetween according to the switching signal SW, to be outputted as the mixed audio signal BA. Also, the DA conversion unit 5 converts the mixed audio signal BA into an analog signal, to be outputted, and then, the speaker 6 coverts the output signal of the DA conversion unit 5 into sound, to be outputted.

===Configuration of Reception State Detecting Unit and Audio Processing Unit===

Configurations of the reception state detecting unit 8 and the audio processing units 12 and 22 will hereinafter be described, referring to FIG. 2.

The reception state detecting unit 8 includes electric field intensity detecting units 81 and 84, an adjacent interference detecting unit 82, a multipass detecting unit 83, and an error rate detecting unit 85, for example, according to an embodiment of the present invention.

The AIF signal outputted from the analog demodulation unit 10 is inputted in parallel to the electric field intensity detecting unit 81, the adjacent interference detecting unit 82, and the multipass detecting unit 83. Also, an analog electric field intensity signal AR1 is outputted from the electric field intensity detecting unit 81, an adjacent interference detection signal AR2 is outputted from the adjacent interference detecting unit 82, and a multipass detection signal AR3 is outputted from the multipass detecting unit 83, respectively, and thus, the analog reception state signal AR includes such three signals.

The DIF signal outputted from the digital demodulation unit 20 is inputted to the electric field intensity detecting unit 84, and the error control signal EC outputted from the decoding unit 25 is inputted to the error rate detecting unit 85. Also, a digital electric field intensity signal DR1 is outputted from the electric field intensity detecting unit 84 and a digital error rate signal DR2 is outputted from the error rate detecting unit 85, respectively, and thus, the digital reception state signal DR includes such two signals.

The audio processing unit 12 includes a volume/quality control unit 121, a stereo demodulation unit 122, a filter 123, and a volume control unit 124, for example, according to an embodiment of the present invention. The analog audio signal AA2 outputted from the delay unit 11 is inputted to the stereo demodulation unit 122, and the analog audio signal AA3 outputted from the stereo demodulation unit 122 is inputted to the (first) filter 123. Also, the analog audio signal AA4 outputted from the filter 123 is inputted to the volume control unit 124, and the analog audio signal AA5 outputted from the volume control unit 124 is inputted to the volume adjusting unit 13. Moreover, the analog reception state signal AR is inputted to the volume/quality control unit 121, and a separation control signal ASC, a frequency control signal AFC, and a volume control signal AVC outputted from the volume/quality control unit 121 are control signals for controlling stereo separation (degree of separation) in the stereo demodulation unit 122, a cutoff frequency of the filter 123, and a gain of the volume control unit 124, respectively.

The audio processing unit 22 includes a volume/quality control unit 221, a separation control unit 222, a filter 223, and a volume control unit 224, for example, according to an embodiment of the present invention. The digital audio signal DA2 outputted from the delay unit 21 is inputted to the separation control unit 222, and the digital audio signal DA3 outputted from the separation control unit 222 is inputted to the (second) filter 223. Also, the digital audio signal DA4 outputted from the filter 223 is inputted to the volume control unit 224, and the digital audio signal DA5 outputted from the volume control unit 224 is inputted to the volume control unit 23. Moreover, the analog reception state signal AR and the digital reception state signal DR are inputted to the volume/quality control unit 221, and a separation control signal DSC, a frequency control signal DFC, and a volume control signal DVC outputted from the volume/quality control unit 221 are control signals for controlling stereo separation in the separation control unit 222, a cutoff frequency of the filter 223, and a gain of the volume control unit 224, respectively.

===Operations of Reception State Detecting Unit, Audio Processing Unit, and Mixing Processing Unit===

Subsequently, operations of the reception state detecting unit 8, the audio processing units 12 and 22, and the mixing processing unit 4 will be described.

The electric field intensity detecting unit 81 of the reception state detecting unit 8 detects an amplitude level of the AIF signal by envelope detection, to be smoothed as appropriate, and then, outputs the analog electric field intensity signal AR1 indicating the electric field intensity of the analog broadcast wave. Also, the adjacent interference detecting unit 82 outputs the adjacent interference detection signal AR2, indicating presence/absence or level of the adjacent interference wave, according to a difference between the electric field intensities respectively detected from the AIF signals having passed through the BPFs for a wide band and a narrow band, for example. Moreover, the multipass detecting unit 83 outputs the multipass detection signal AR3, indicating presence/absence or level of the multipass interference wave according to variations in the amplitude level of the AIF signal, for example.

On the other hand, the electric field intensity detecting unit 84 of the reception state detecting unit 8 detects an amplitude level of the DIF signal by envelope detection, to be smoothed as appropriate, and then, outputs the digital electric field intensity signal DR1 indicating the electric field intensity of the digital broadcast wave, for example. Also, the error rate detecting unit 85 counts the error control signal EC every predetermined data block or unit time, and outputs the digital error rate signal DR2 indicating occurrence of error control such as error detection or error correction in the decoding processing of the decoding unit 25, for example.

The volume/quality control unit 121 of the audio processing unit 12 outputs the separation control signal ASC, the frequency control signal AFC, and the volume control signal AVC, according to the reception state of the analog broadcast wave, which is indicated by the analog electric field intensity signal AR1, the adjacent interference detection signal AR2 or the multipass detection signal AR3 or a combination thereof. Also, the stereo demodulation unit 122 demodulates the analog audio signal AA2 into a stereo signal with a stereo separation (degree of separation) according to the separation control signal ASC. Moreover, the filter 123 is an LPF (Low-Pass Filter) that removes from the analog audio signal AA3 a component whose frequency is higher than or equal to a cutoff frequency corresponding to the frequency control signal AFC. The volume control unit 124 amplifies or attenuates the analog audio signal AA4 according to the volume control signal AVC.

As such, the audio processing unit 12 controls the quality (stereo separation and frequency characteristics) and the volume of the analog audio signal AA2 by performing sequential processing according to the analog reception state signal AR in the stereo demodulation unit 122, the filter 123, and the volume control unit 124, and outputs the result as the analog audio signal AA5.

For example, if the analog broadcast wave has a sufficiently intense electric field and there is no adjacent interference wave or multipass interference wave, that is, if the reception state of the analog broadcast wave is favorable, the audio processing unit 12 executes control so that the stereo separation in the stereo demodulation unit 122 becomes high, the cutoff frequency of the filter 123 becomes high, and the gain of the volume control unit 124 is increased, and outputs the analog audio signal AA5 with high quality and great volume. On the other hand, for example, if the analog broadcast wave is a weak electric field or there is a interference wave, that is, if the reception state of the analog broadcast wave is unfavorable, the audio processing unit 12 executes control so that the stereo separation in the stereo demodulation unit 122 becomes low, the cutoff frequency of the filter 123 becomes low, and the gain of the volume control unit 124 is decreased, and outputs the analog audio signal AA5 with low quality and small volume.

Also, as a control method in the audio processing unit 12, for example, the volume/quality control unit 121 sets target values of the separation control signal ASC, the frequency control signal AFC, and the volume control signal AVC according to the analog reception state signal AR, and smoothly brings the values of the three signals close to the target values using a counter or the like.

The volume/quality control unit 221 of the audio processing unit 22 outputs the separation control signal DSC, the frequency control signal DFC, and the volume control signal DVC, according to the reception state of the analog broadcast wave, which is indicated by the analog reception state signal AR, as in the case of the volume/quality control unit 121. Also, the separation control unit 222 mixes left and right channel signals of the digital audio signal DA2 so that the stereo separation according to the separation control signal DSC can be obtained. Operation of the separation control unit 222 will be described later in detail. Moreover, the filter 223 is an LPF that removes from the digital audio signal DA3 a component whose frequency is higher than or equal to a cutoff frequency corresponding to the frequency control signal DFC. The volume control unit 224 amplifies or attenuates the digital audio signal DA4 according to the volume control signal DVC.

As such, the audio processing unit 22 controls the quality and volume of the digital audio signal DA2 by performing sequential processing according to the analog reception state signal AR in the separation control unit 222, the filter 223, and the volume control unit 224, as in the case of the audio processing unit 12, and outputs the result as the digital audio signal DA5.

In FM radio broadcasting by the IBOC method, for example, as illustrated in FIG. 8, if a broadcasting station broadcasts only the digital broadcasting, a band (f0-f1 to f0, and f0 to f0+f1) for the analog broadcast wave in FIG. 8 is used for the digital broadcasting as a second side band with a low output. Thus, if the analog electric field intensity signal AR1 is at a predetermined level or lower, for example, the audio processing unit 22 can control the quality and volume of the digital audio signal DA2 according to the digital reception state signal DR. As an example, in the case where the broadcasting station broadcasts only the digital broadcasting, if the digital broadcast wave becomes unable to be received anymore or becomes able to be received, processing such as fade-out or fade-in is performed in the volume control unit 224, so that rapid change in volume can be alleviated.

Figure 11:
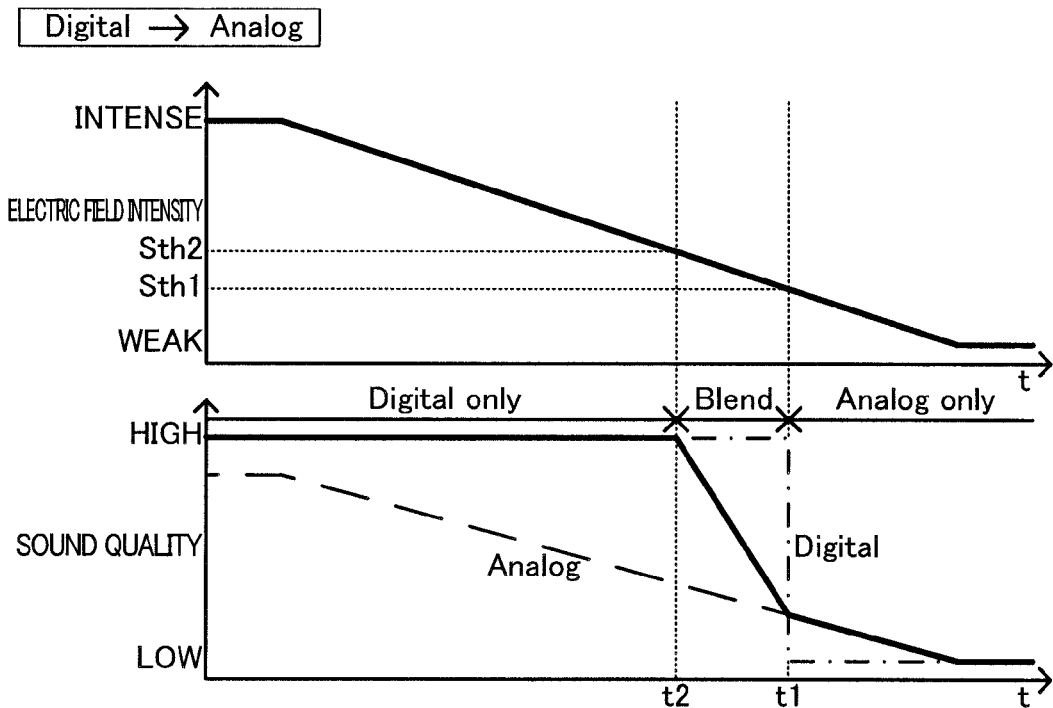
FIG. 11 is a schematic diagram illustrating an example of a relationship between a change in electric field intensity and a change in quality in IBOC-method radio broadcasting.

As mentioned above, the mixing processing unit 4 mixes the analog audio signal AA6 and the digital audio signal DA6 at a predetermined ratio as well as switches therebetween according to the switching signal SW, to be output as the mixed audio signal BA. As in the case of FIG. 11, there is illustrated in FIG. 4 examples of changes in the quality and volume of the analog audio signal AA6, the digital audio signal DA6, and the mixed audio signal BA when the analog broadcast wave is changed from the intense electric field to the weak electric field in the IBOC-method radio broadcasting.

Figure 4:
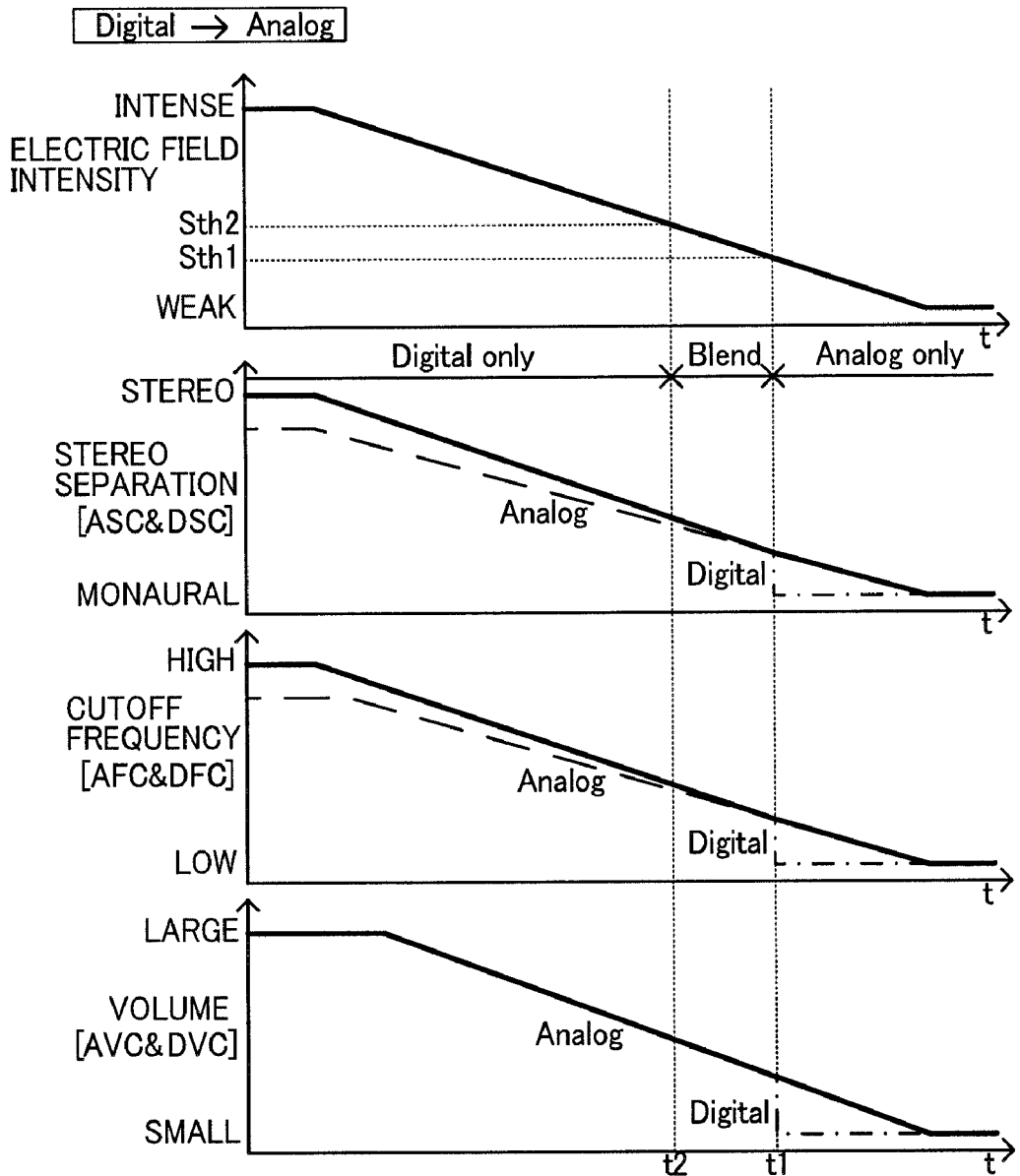
FIG. 4 is a diagram illustrating an example of operations of audio processing units 12 and 22, and a mixing processing unit 4.

FIG. 4 illustrates a case where the audio processing units 12 and 22 execute similar control for the analog audio signal AA2 and the digital audio signal DA2, respectively. Also, it is assumed that the adjacent interference wave and the multipass interference wave are not detected and that the adjacent interference detection signal AR2 and the multipass detection signal AR3 are not changed, and that the audio processing unit 22 does not execute control according to the digital reception state signal DR. In FIG. 4, the analog audio signal AA6, the digital audio signal DA6, and the mixed audio signal BA are indicated by a long-dashed line, a dashed-dotted line, and a solid line, respectively.

In the analog audio signal AA6, stereo separation, cutoff frequency, and volume are lowered as the electric field intensity of the analog broadcast wave is decreased.

In the digital audio signal DA6, the stereo separation, cutoff frequency, and volume are lowered as the electric field intensity of the analog broadcast wave is lowered, during a period till a time t1 when the analog broadcast wave has an electric field whose level is more intense than the intensity level Sth1. The audio processing unit 22 smoothly changes the stereo separation, cutoff frequency, and volume so that the quality and volume of the digital audio signal DA6 become equal to those of the analog audio signal AA6 at the time t1. Also, at the time t1 and thereafter, the digital audio signal DA6 becomes almost unable to be reproduced as sound, and thus, the signal is not controlled by the audio processing unit 22, so that the stereo separation, cutoff frequency, and volume become the lowest level.

During a period till a time t2 when the analog broadcast wave has an electric field whose level is more intense than the intensity level Sth2, the mixing processing unit 4 mixes the analog audio signal AA6 and the digital audio signal DA6 at a ratio of 0% and 100%, respectively, and the mixed audio signal BA becomes equal to the digital audio signal DA6. Also, during a period from the time t2 to the time t1, the mixing processing unit 4 smoothly changes the ratio of mixing between the analog audio signal AA6 and the digital audio signal DA6, and thus, the mixed audio signal BA is smoothly brought close to the digital audio signal DA6 from the analog audio signal AA6. Moreover, at the time t1 and thereafter, the mixing processing unit 4 mixes the analog audio signal AA6 and the digital audio signal DA6 at a ratio of 100% and 0%, respectively, and thus, the mixed audio signal BA becomes equal to the analog audio signal AA6.

As such, the mixing processing unit 4 smoothly switches the mixed audio signal BA from the analog audio signal AA6 to the digital audio signal DA6 by smoothly changing the mixing ratio during the period from the time t2 to the time t1. Also, the audio processing units 12 and 22 can alleviate the change in the quality and volume of the mixed audio signal BA when the analog audio signal AA6 is switched to the digital audio signal DA6, by executing control so that the quality and volume of the digital audio signal DA6 becomes equal to those of the analog audio signal AA6 at the time t1. When the analog broadcast wave changes from the weak electric field to the intense electric field, the changes in the quality and volume of the analog audio signal AA6, the digital audio signal DA6, and the mixed audio signal BA are opposite in direction from those in FIG. 4.

===Configuration and Operation of Separation Control Unit===

Figure 3:
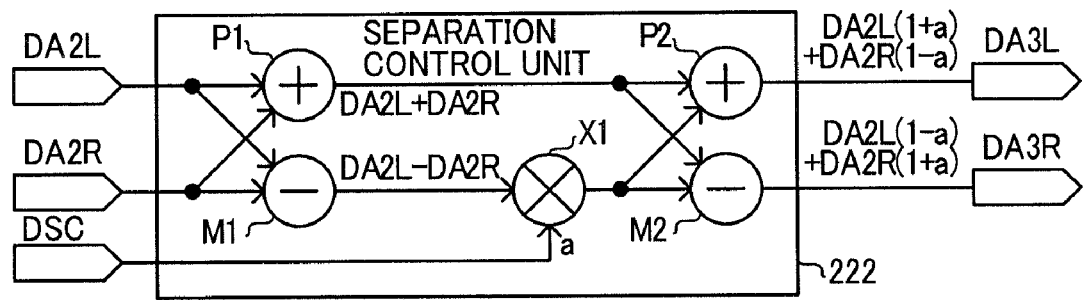
FIG. 3 is a block diagram illustrating an example of a detailed configuration of a separation control unit 222.

A configuration of the separation control unit 222 will hereinafter be described referring to FIG. 3.

The separation control unit 222 includes addition units P1 and P2, subtraction units M1 and M2, and a multiplication unit X1, for example, according to an embodiment of the present invention.

A left channel signal DA2L and a right channel signal DA2R of the digital audio signal DA2 are both inputted to the (first) addition unit P1 and the (first) subtraction unit M1. Also, a difference signal outputted from the subtraction unit M1 and the separation control signal DSC outputted from the volume/quality control unit 221 are inputted to the multiplication unit X1. Moreover, a sum signal outputted from the addition unit P1 and a product signal outputted from the multiplication unit X1 are both inputted to the (second) addition unit P2 and the (second) subtraction unit M2. The output signals of the addition unit P2 and the subtraction unit M2 are a left channel signal DA3L (seventh audio signal) and a right channel signal DA3R (eighth audio signal) of the digital audio signal DA3, respectively.

Subsequently, an operation of the separation control unit 222 will be described.

The addition unit P1 adds the left channel signal DA2L and the right channel signal DA2R and outputs a sum signal (DA2L+DA2R). Also, the subtraction unit M1 subtracts the right channel signal DA2R from the left channel signal DA2L and outputs a difference signal (DA2L−DA2R). Moreover, the multiplication unit X1 multiplies the difference signal by a value of the separation control signal DSC as a coefficient a, and outputs a product signal. The coefficient a is controlled so as to be a value of 0 or more and 1 or less by the volume/quality control unit 221. The addition unit P2 adds the sum signal and the product signal, and outputs the left channel signal DA3L, while the subtraction unit M2 subtracts the product signal from the sum signal, and outputs the right channel signal DA3R. Therefore, the left channel signal DA3L and the right channel signal DA3R can be expressed as follows, respectively:

$$DA3L=DA2L(1+a)+DA2R(1-a)$$

$$DA3R=DA2L(1-a)+DA2R(1+a)$$

As mentioned above, the separation control unit 222 outputs the digital audio signal DA3 in which the stereo separation is expressed as the coefficient a. The stereo separation of the digital audio signal DA3 becomes the maximum level (stereo signal) in the case of a=1, and becomes the minimum level (monaural signal) in the case of a=0.

As mentioned above, in the receiving apparatus illustrated in FIG. 1, the audio processing units 12 and 22 control the volume and quality of the analog audio signal AA2 and the digital audio signal DA2 according to the analog reception state signal AR, respectively, and output from the mixing processing unit 4 the mixed audio signal BA obtained by mixing the analog audio signal AA6 and the digital audio signal DA6 at a predetermined ratio, and thus, the change in the volume and quality of the mixed audio signal BA can be alleviated in switching between the analog audio signal AA6 and the digital audio signal DA6.

Also, the mixing processing unit 4 can smoothly switch the mixed audio signal BA from one signal to the other signal by smoothly changing a mixing ratio between the analog audio signal AA6 and the digital audio signal DA6.

Also, the separation control unit 222 can control the stereo separation according to the analog reception state signal AR as in the case of the stereo demodulation unit 10 by mixing the left and right channel signals of the digital audio signal DA2.

Also, by adding and subtracting the sum signal of the left channel signal DA2L and the right channel signal DA2R and the product signal obtained by multiplying the difference signal of the left channel signal DA2L and the right channel signal DA2R by the value of the separation control signal DSC as the coefficient a, the digital audio signal DA3, in which the stereo separation is expressed by the coefficient, a can be outputted.

Also, the filters 123 and 223 can control high frequency characteristics according to the analog reception state signal AR, by removing components at cutoff frequencies according to the analog reception state signal AR or higher frequencies from the analog audio signal AA3 and the digital audio signal DA3, respectively.

Also, when the analog electric field intensity signal AR1 is at a predetermined level or lower, the audio processing unit 22 can control the volume and quality of the digital audio signal DA2 by executing control according to the digital reception state signal DR even if the broadcasting station broadcasts only the digital broadcasting.

In an embodiment as described above, as an example of bands of the analog broadcast wave and the digital broadcast wave, there is described those used in a case of the IBOC-method FM radio broadcasting, however, this is not limitative. The receiving apparatus of the present invention can be applied to a case of the simultaneous broadcasting in which the same program is broadcasted in the analog broadcasting and the digital broadcasting at the same time, and such a type of simultaneous broadcasting is also broadcasted in the IBOC-method AM radio broadcasting, for example. Also, the bands of the analog broadcast wave and the digital broadcast wave may be in a relationship other than such a relationship illustrated in FIG. 8 that the bands of the digital broadcast wave are on both sides of the band of the analog broadcast wave.

In an embodiment as described above, the IF signal, which is a digital signal, is inputted to the analog demodulation unit 10 and the digital demodulation unit 20, and the subsequent processing is digital signal processing, as illustrated in FIG. 1, however, this is not limitative. For example, the processing only from the digital demodulation unit 20 to the volume adjusting unit 23 may be performed by the digital signal processing, by directly inputting the output signal of the receiving unit 2 to the analog demodulation unit 10 so that the subsequent processing is performed by the analog signal processing, and by converting the output signal of the volume adjusting unit 23 into an analog signal, to be inputted to the mixing processing unit 4. In the configuration illustrated in FIG. 1, the processing from the delay unit 11 to the volume adjusting unit 13 and the processing from the delay unit 21 to the volume adjusting unit 23 are approximate processing, and thus, such configuration is suitable for a case where a digital signal processor is used.

Figure 2:
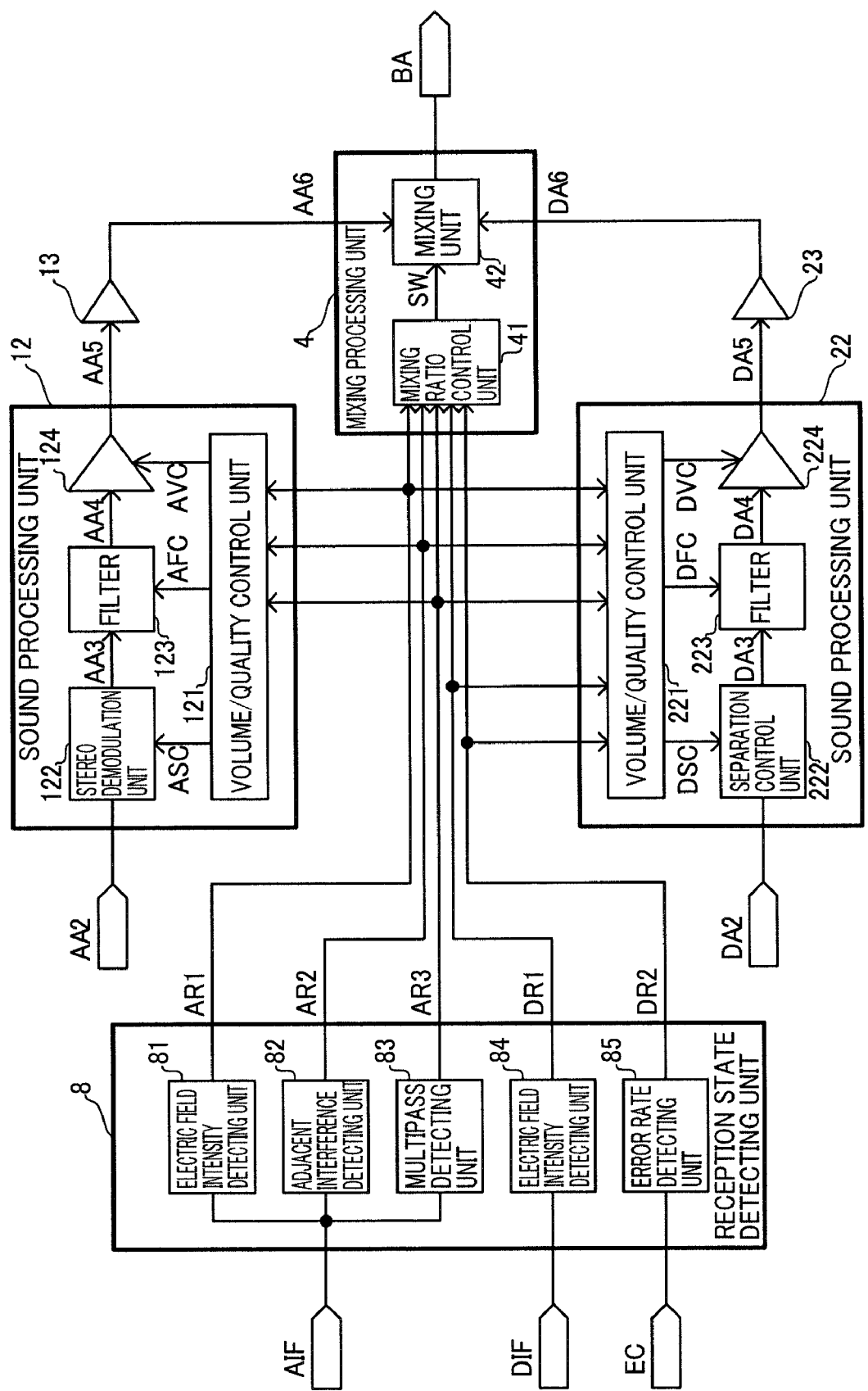
FIG. 2 is a block diagram illustrating an example of a detailed configuration of a reception state detecting unit 8 and audio processing units 12 and 22.

In an embodiment as described above, the audio processing units 12 and 22 both control the stereo separation, the high frequency characteristics, and the volume for the inputted audio signals, as illustrated in FIG. 2, however, this is not limitative. The audio processing units 12 and 22 may have only a part of the control functions of the stereo separation, the high frequency characteristics, and the volume, or may have another control function. For example, an HPF or BPF may be added to the filters 123 and 223, which are LPFs, or an equalizer may be provided that controls the frequency characteristics of an audio signal in general.

Figure 5:
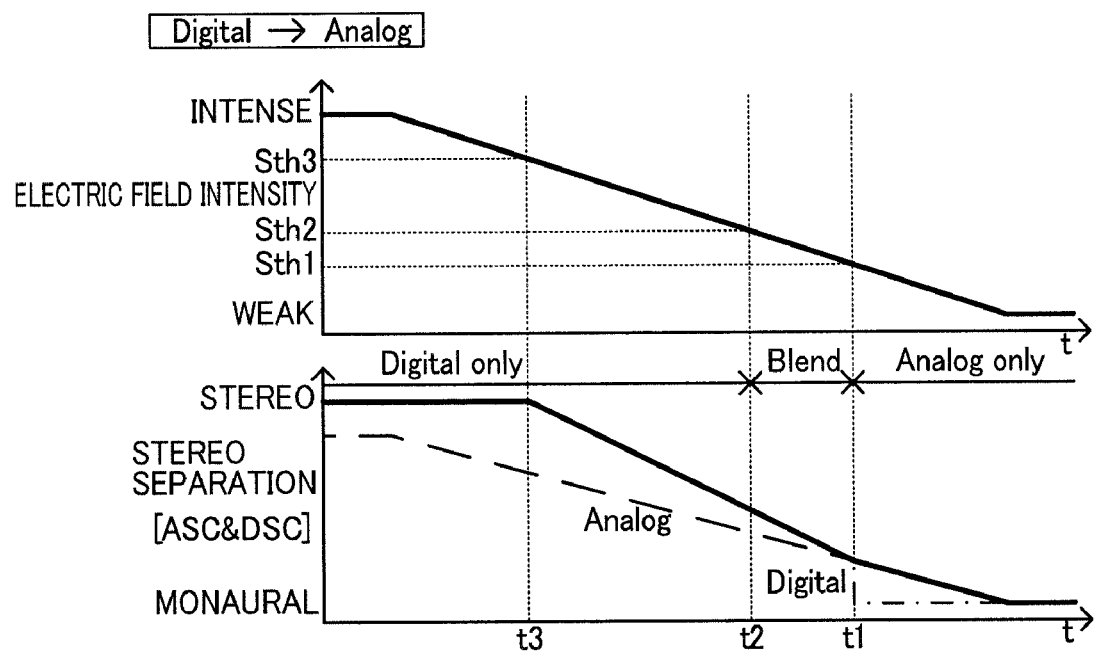
FIG. 5 is a diagram illustrating another example of control in a separation control unit 222.
Figure 6:
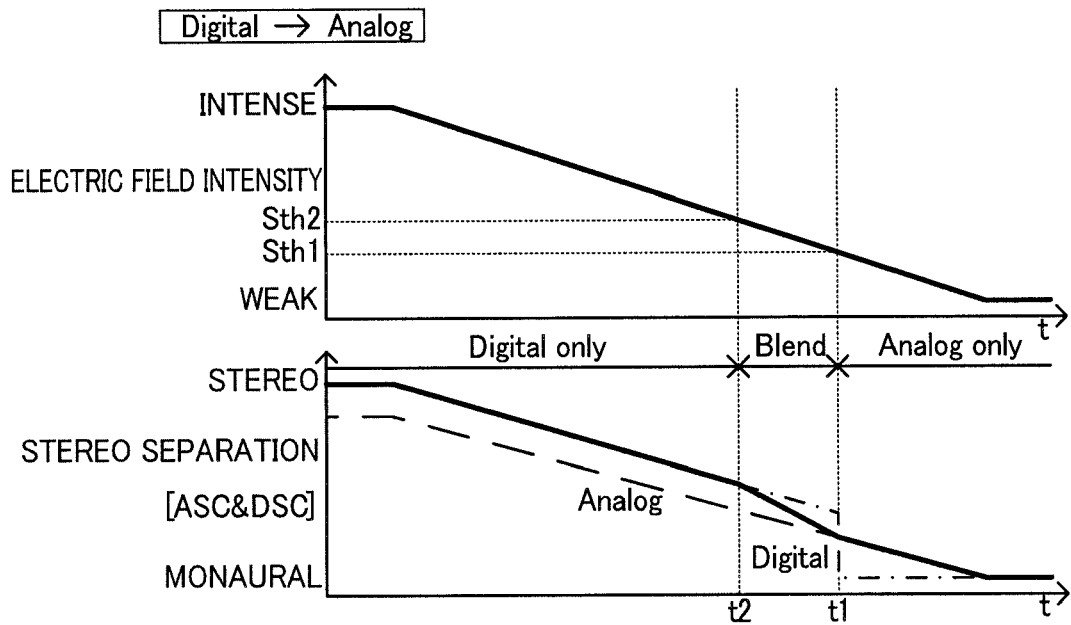
FIG. 6 is a diagram illustrating still another example of control in a separation control unit 222.

In an embodiment as described above, the audio processing units 12 and 22 execute the similar control for the analog audio signal AA2 and the digital audio signal DA2, respectively, as illustrated in FIG. 4, however, this is not limitative. As illustrated in FIG. 5, for example, the separation control unit 222 can execute control so that the stereo separation is kept at the maximum level during a period till a time t3 when the analog broadcast wave has an electric field whose level is more intense than the intensity level Sth3 (>Sth2). Alternatively, as illustrated in FIG. 6, for example, the separation control unit 222 may control the stereo separation so as to become higher than the stereo separation in the stereo demodulation unit 122 at a predetermined rate. Moreover, the filter 223 may control the cutoff frequency as in the case of the control of the stereo separation illustrated in FIG. 5 or 6. In such cases, as compared with the case in FIG. 4, the quality changes rapidly of the mixed audio signal BA when the analog audio signal AA6 is switched to the digital audio signal DA6, however, the quality is improved of the mixed audio signal BA in a period during which the digital broadcast wave can be received.

In an embodiment as described above, the analog audio signal AA5 and the digital audio signal DA5 outputted from the audio processing units 12 and 22, respectively, have the volume difference therebetween adjusted in the volume adjusting units 13 and 23, however, this is not limitative. In Particular, as illustrated in FIG. 2, if the volume is controlled in the audio processing units 12 and 22, the function of adjusting the volume difference in the volume adjusting units 13 and 23 may be included in the volume control units 124 and 224, respectively. Alternatively, a configuration may be such that the volume adjusting units 13 and 23 are arranged on the front stages of the audio processing units 12 and 22, respectively.

In an embodiment as described above, the five signals included in the analog reception state signal AR and the digital reception state signal DR are all inputted to the mixing ratio control unit 41 that outputs the switching signal SW for controlling a mixing ratio in the mixing unit 42, however, this is not limitative. The mixing ratio control unit 41 may generate the switching signal SW using a part of the five signals. Alternatively, as disclosed in Japanese Patent Laid-Open Publication No. 2006-115200, for example, the switching signal SW may be generated further using a ratio of carrier wave to noise in the digital broadcast wave.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A receiving apparatus comprising:
an analog demodulation unit configured to demodulate a first audio signal from a broadcast wave of analog broadcasting whose frequency is included in a predetermined frequency band;
a digital demodulation/decoding unit configured to demodulate and decode a second audio signal from a broadcast wave of digital broadcasting whose frequency is included in the frequency band, the digital broadcasting being the same in contents as the analog broadcasting;
a delay unit configured to delay at least one of the first and second audio signals, to be outputted as third and fourth audio signals, respectively;
a reception state detecting unit configured to output an analog reception state signal indicating a reception state of the broadcast wave of the analog broadcasting;
the first audio processing unit configured to control at least one of volume and quality of the third audio signal, to be outputted as a fifth audio signal, according to the analog reception state signal;
the second audio processing unit configured to control at least one of volume and quality of the fourth audio signal, to be outputted as a sixth audio signal, according to the analog reception state signal; and
a mixing processing unit configured to mix the fifth audio signal and the sixth audio signal at a predetermined ratio, to be outputted, according to a reception state of at least one of the broadcast wave of the analog broadcasting and the broad cast wave of the digital broadcasting.

2. The receiving apparatus according to claim 1, wherein the mixing processing unit mixes the fifth audio signal and the sixth audio signal at a predetermined ratio as well as switches therebetween, to be outputted, according to the reception state of at least one of the broadcast wave of the analog broadcasting and the broadcast wave of the digital broadcasting.

3. The receiving apparatus according to claim 2, wherein the first audio processing unit includes a stereo demodulation unit configured to demodulate the third audio signal into a stereo signal based on a degree of separation corresponding to the analog reception state signal, and wherein
the second audio processing unit includes a separation control unit configured to mix left and right channel signals of the fourth audio signal so as to have a degree of separation corresponding to the analog reception state signal.

4. The receiving apparatus according to claim 3, wherein the separation control unit includes:
a first addition unit configured to output a sum signal indicative of a sum of the left and right channel signals;
a first subtraction unit configured to output a difference signal indicative of a difference between the left and right channel signals;
a multiplication unit configured to output a product signal obtained by multiplying the difference signal by a coefficient of 0 or greater and 1 or smaller according to the analog reception state signal;
a second addition unit configured to add the sum signal and the product signal, to be outputted as a seventh audio signal; and
a second subtraction unit configured to subtract the product signal from the sum signal, to be outputted as an eighth audio signal.

5. The receiving apparatus according to claim 2, wherein the first audio processing unit includes a first filter configured to remove a component, whose frequency is higher than or equal to a frequency corresponding to the analog reception state signal, included in the third audio signal; and
the second audio processing unit includes a second filter configured to remove a component, whose frequency is higher than or equal to a frequency corresponding to the analog reception state signal, included in the fourth audio signal.

6. The receiving apparatus according to claim 1, wherein the first audio processing unit includes a stereo demodulation unit configured to demodulate the third audio signal into a stereo signal based on a degree of separation corresponding to the analog reception state signal, and wherein
the second audio processing unit includes a separation control unit configured to mix left and right channel signals of the fourth audio signal so as to have a degree of separation corresponding to the analog reception state signal.

7. The receiving apparatus according to claim 6, wherein the separation control unit includes:
a first addition unit configured to output a sum signal indicative of a sum of the left and right channel signals;
a first subtraction unit configured to output a difference signal indicative of a difference between the left and right channel signals;
a multiplication unit configured to output a product signal obtained by multiplying the difference signal by a coefficient of 0 or greater and 1 or smaller according to the analog reception state signal;
a second addition unit configured to add the sum signal and the product signal, to be outputted as a seventh audio signal; and
a second subtraction unit configured to subtract the product signal from the sum signal, to be outputted as an eighth audio signal.

8. The receiving apparatus according to claim 1, wherein the first audio processing unit includes a first filter configured to remove a component, whose frequency is higher than or equal to a frequency corresponding to the analog reception state signal, included in the third audio signal; and the second audio processing unit includes a second filter configured to remove a component, whose frequency is higher than or equal to a frequency corresponding to the analog reception state signal, included in the fourth audio signal.

9. The receiving apparatus according to claim 1, wherein the analog reception state signal includes an analog electric field intensity signal indicating an electric field intensity of the broadcast wave of the analog broadcasting;

the reception state detecting unit further outputs a digital reception state signal indicating a reception state of the broadcast wave of the digital broadcasting; and the second audio processing unit controls at least one of the volume and the quality of the fourth audio signal, to be outputted as the sixth audio signal, according to the digital reception state signal, if the analog electric field intensity signal is at a predetermined level or lower.

* * * * *